US012320274B2

(12) United States Patent
Duong et al.

(10) Patent No.: US 12,320,274 B2
(45) Date of Patent: Jun. 3, 2025

(54) COMPRESSOR STATOR WITH LEADING EDGE FILLET

(71) Applicant: PRATT & WHITNEY CANADA CORP., Longueuil (CA)

(72) Inventors: Hien Duong, Mississauga (CA); Vijay Kandasamy, Tamil Nadu (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 67 days.

(21) Appl. No.: 17/399,435

(22) Filed: Aug. 11, 2021

(65) Prior Publication Data

US 2021/0372288 A1 Dec. 2, 2021

Related U.S. Application Data

(63) Continuation of application No. 16/165,501, filed on Oct. 19, 2018, now Pat. No. 11,118,466.

(51) Int. Cl.
    *F01D 9/04* (2006.01)
    *F01D 5/14* (2006.01)

(52) U.S. Cl.
    CPC ............. *F01D 9/041* (2013.01); *F01D 5/143* (2013.01); *F01D 5/145* (2013.01); *F01D 5/147* (2013.01); *F05D 2220/3216* (2013.01); *F05D 2240/121* (2013.01); *F05D 2240/123* (2013.01); *F05D 2260/00* (2013.01)

(58) Field of Classification Search
    CPC .............................. F01D 9/02; F05D 2240/121
    See application file for complete search history.

(56) References Cited

U.S. PATENT DOCUMENTS 5,947,683 A * 9/1999 Kobayashi .............. F01D 5/145
                                                           415/208.1
6,079,948 A   6/2000 Sasaki
                    (Continued)

FOREIGN PATENT DOCUMENTS

DE  102012207735 A1 * 11/2013 ............. F01D 5/141
WO  2014113043      7/2014

OTHER PUBLICATIONS

English translation of DE102012207735A1 (Year: 2013).*
(Continued)

*Primary Examiner* — Sabbir Hasan
*Assistant Examiner* — Esley Le Fisher
(74) *Attorney, Agent, or Firm* — NORTON ROSE FULBRIGHT CANADA LLP

(57) ABSTRACT

A compressor has: a rotor and a stator having vanes, a vane of the vanes having an airfoil extending from a root proximate an inner hub to a radially outer tip, the airfoil having a leading edge, a trailing edge, and a chord extending between the leading edge and the trailing edge to define a chord length, the airfoil having a pressure side surface and a suction side surface, and a fillet disposed at the leading edge of the root of the airfoil and extending between the pressure side surface and the inner hub, the fillet having a radial height being maximum at the leading edge, the radial height decreasing from the leading edge to blend smoothly into a remainder of the airfoil, the fillet extending downstream from the leading edge a chord-wise distance of less than 50% of a chord length of the airfoil on the pressure side surface.

19 Claims, 4 Drawing Sheets

(56) References Cited

U.S. PATENT DOCUMENTS

| | | | |
|---|---|---|---|
| 6,419,446 B1 * | 7/2002 | Kvasnak | F01D 5/145 416/235 |
| 6,884,029 B2 * | 4/2005 | Beeck | F01D 5/145 416/193 A |
| 6,969,232 B2 * | 11/2005 | Zess | F04D 29/681 416/193 A |
| 7,134,842 B2 | 11/2006 | Tam et al. | |
| 7,625,181 B2 * | 12/2009 | Matsuda | F01D 5/143 416/193 A |
| 8,206,095 B2 | 6/2012 | Parker et al. | |
| 8,511,978 B2 | 8/2013 | Allen-Bradley et al. | |
| 8,554,565 B2 * | 10/2013 | Nishiyama | G10L 13/06 704/258 |
| 9,074,482 B2 * | 7/2015 | Propheter-Hinckley | B22F 10/28 |
| 10,294,796 B2 * | 5/2019 | Li | F01D 25/12 |
| 2002/0141863 A1 | 10/2002 | Liu et al. | |
| 2004/0081548 A1 | 4/2004 | Zess et al. | |
| 2013/0280074 A1 * | 10/2013 | Propheter-Hinckley | B22F 10/28 416/204 R |
| 2014/0248154 A1 | 9/2014 | Guemmer | |
| 2016/0003048 A1 | 1/2016 | Gray et al. | |
| 2016/0258296 A1 | 9/2016 | Bergman et al. | |
| 2016/0273362 A1 * | 9/2016 | Li | F01D 5/187 |
| 2017/0009587 A1 | 1/2017 | Szymanski | |
| 2018/0017075 A1 | 1/2018 | Bailey et al. | |

OTHER PUBLICATIONS

David Gordon Wilson, "Glossary of Terms—Turbomachinery and Gas Turbines", pp. 487-492; published by the MIT Press, 5th printing (Year: 1991.

* cited by examiner

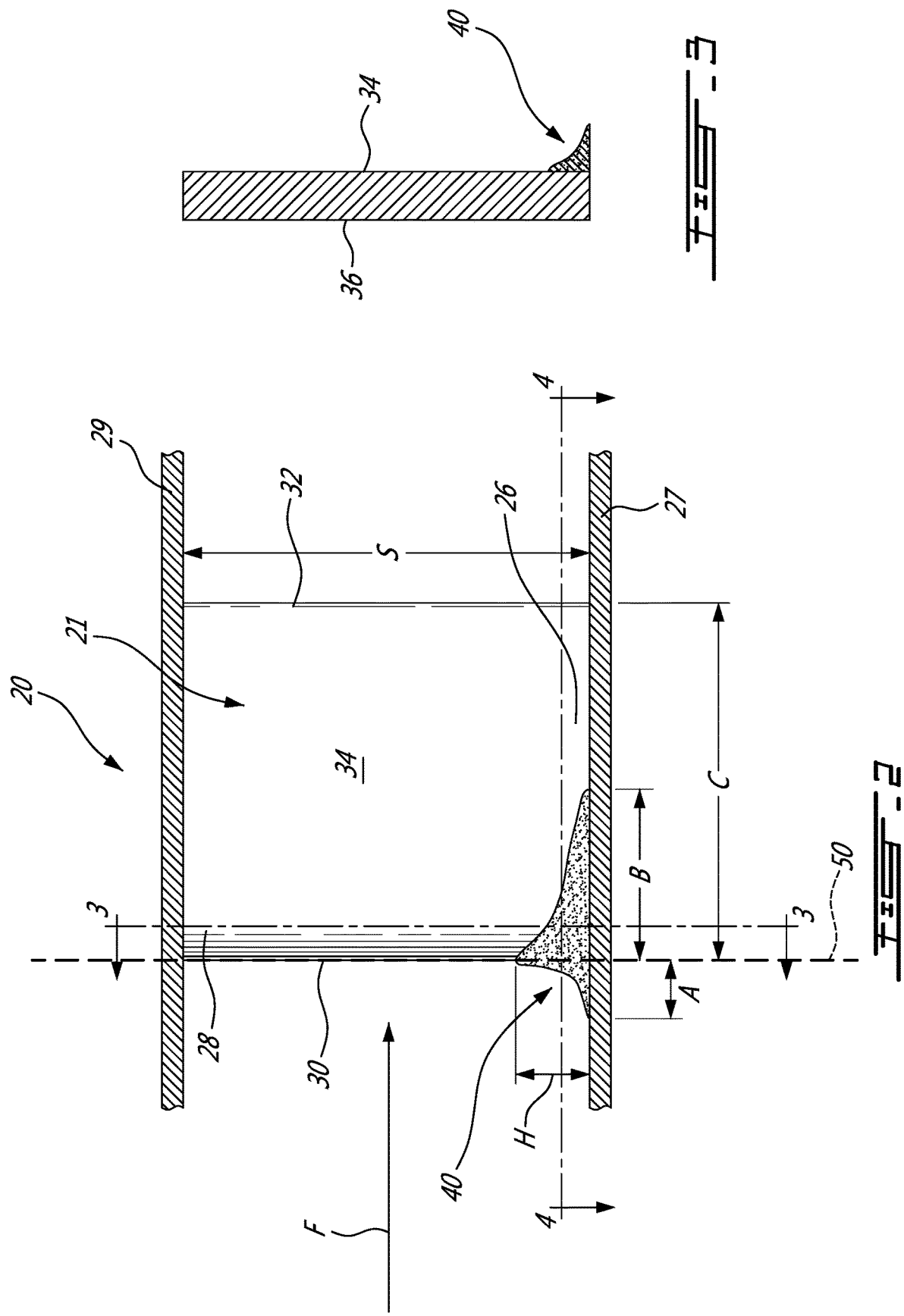

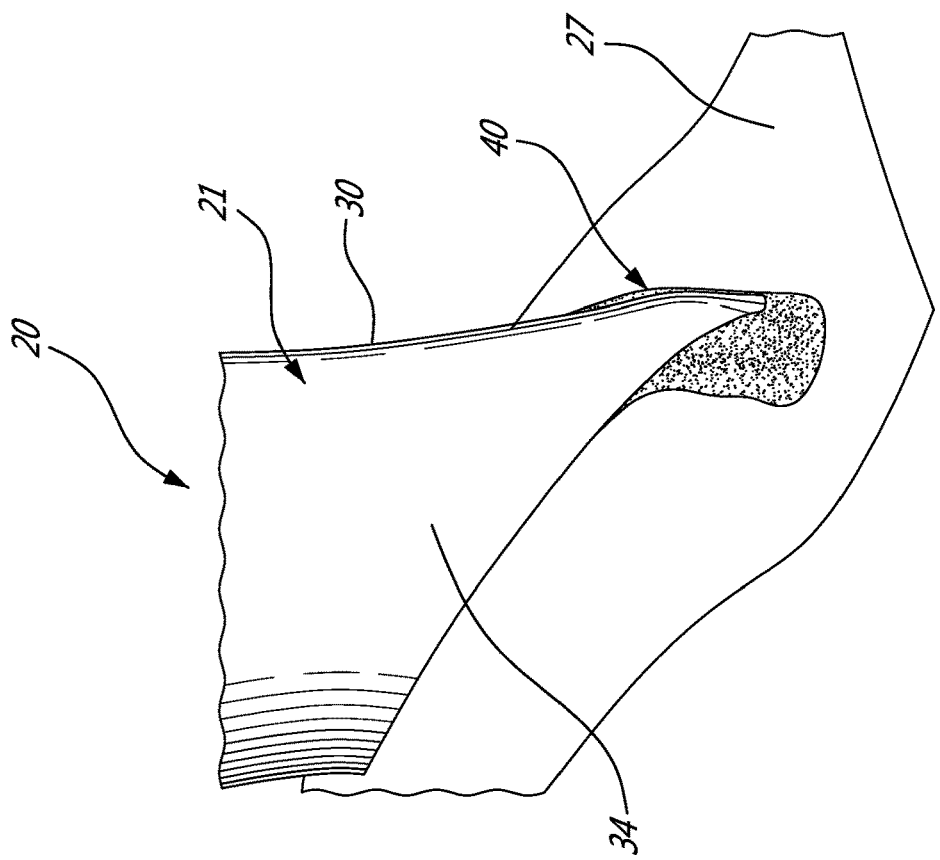
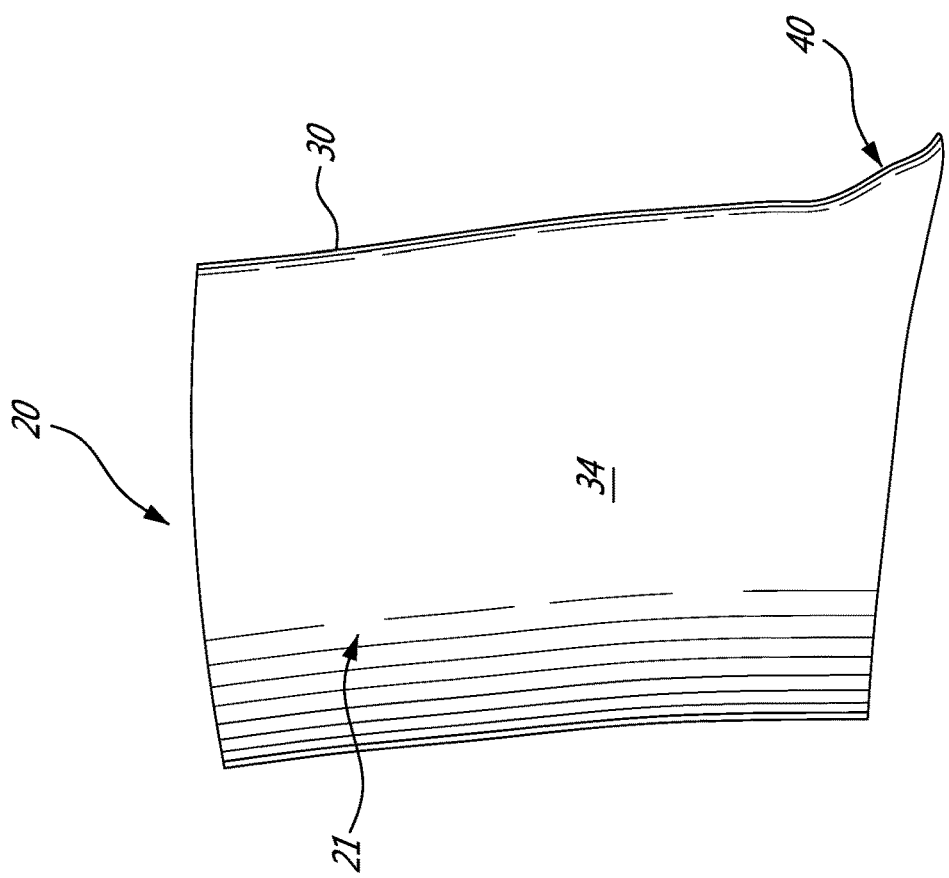

COMPRESSOR STATOR WITH LEADING EDGE FILLET

CROSS-REFERENCE TO RELATED APPLICATIONS

The present application is a continuation of U.S. patent application Ser. No. 16/165,501 filed Oct. 19, 2018, the entire content of which is incorporated herein by reference.

TECHNICAL FIELD

The application relates generally to stators for gas turbine engines, and more particularly, to compressor stators.

BACKGROUND

The fans of many turbofan engines have fan blades with a large slope at the root of the fan airfoils and a large change in radius, from the leading edge to the trailing edge, at the fan blade roots. These properties may provide certain aerodynamic advantages. However, when fan chord is minimized for engine length/weight reasons, or fan blade root is thickened for structural reasons, the resulting high slope at the fan blade root can compromise the downstream fan root flow.

Consequently, the flow downstream of the fan blade root in such fans can carry large circumferential wake and thick end wall boundary layers. This can cause high incidence angle of the flow at the downstream stators, which may cause undesirable effects, such as the initiation of premature stall on the fan core stators downstream of the fan.

SUMMARY

In one aspect, there is provided a compressor for a gas turbine engine, the compressor comprising: a rotor rotatable about a central axis and a stator located downstream of the rotor, the stator comprising vanes a vane of the vanes having an airfoil extending along a direction having a radial component relative to the central axis from a root proximate an inner hub of the stator to a radially outer tip, a span of the airfoil defined between the root and the radially outer tip, the airfoil having a leading edge, a trailing edge, and a chord extending between the leading edge and the trailing edge to define a chord length, the airfoil having a pressure side surface and a suction side surface each extending on opposite sides of the airfoil between the leading edge and the trailing edge, and a fillet disposed at the leading edge of the root of the airfoil and extending between the pressure side surface of the airfoil and the inner hub, the fillet having a radial height being maximum at the leading edge, the radial height decreasing from the leading edge to blend smoothly into a remainder of the airfoil, the fillet extending downstream from the leading edge a chord-wise distance of less than 50% of a chord length of the airfoil on the pressure side surface.

The compressor may also include any of the following features, in whole or in part, and in any combination.

In some embodiments, the chord-wise distance is from 10% to 50% of the chord length.

In some embodiments, the fillet extends upstream from the leading edge of a remainder of the airfoil, the fillet extending away from the pressure side surface a greater distance than the fillet extends away from the suction side surface.

In some embodiments, the fillet extends upstream from the leading edge a second chord-wise distance of less than 20% of the chord length.

In some embodiments, the second chord-wise distance is from 5% to 20% of the chord length.

In some embodiments, the fillet is disposed only on the pressure side surface of the airfoil, the suction side surface being free of the fillet.

In some embodiments, the fillet has a fillet suction side extending tangentially from the suction side surface of the airfoil in an upstream direction.

In some embodiments, the fillet extends radially away from the root a span-wise distance of less than 10% of the span of the airfoil.

In some embodiments, the span-wise distance is from 2% to 10% of the span of the airfoil.

In some embodiments, a first staggered angle is defined at the fillet, and a second staggered angle is defined at the leading edge of the airfoil at a point thereon outside of the fillet, the first staggered angle being greater than the second staggered angle, the first staggered angle is from 5 to 10 degrees greater than the second staggered angle.

In some embodiments, the fillet has a fillet radius that is from 5% to 15% of the span of the airfoil.

In another aspect, there is provided a turbofan engine comprising a fan and a casing defining a bypass duct surrounding an engine core defining an annular gas passage, a fan stator disposed within the engine core downstream of the fan, the fan stator including vanes circumferentially spaced-apart around a circumference of the fan stator within the annular gas passage, a vane of the vanes having an airfoil extending between a root and a tip spaced apart by a span of the airfoil, the airfoil having a leading edge and a trailing edge spaced apart along a chord by a chord length of the airfoil, a pressure side surface and a suction side surface respectively extending on opposite sides of the airfoil between the leading edge and the trailing edge, and a leading edge fillet disposed at the root of the airfoil on the pressure side surface, the leading edge fillet extending downstream from the leading edge a chord-wise distance of less than 50% of a chord length of the airfoil on the pressure side surface.

The turbofan engine may include any of the following features, in whole or in part, in any combination.

In some embodiments, chord-wise distance is from 10-50% of the chord length.

In some embodiments, the leading edge fillet extends upstream from the leading edge a distance of from 5-20% of the chord length.

In some embodiments, the leading edge fillet extends radially away from the root a distance of from 2-10% of the span.

In some embodiments, a first staggered angle is defined at the leading edge fillet and a second staggered angle is defined at the leading edge of the airfoil at a point thereon radially above the leading edge fillet, the first staggered angle being from 5 to 10 degrees greater than the second staggered angle.

In yet another aspect, there is provided a gas turbine engine comprising: a compressor with a rotor and a stator located downstream of the rotor, the stator having vanes, a vane of the vanes having an airfoil extending span-wise between a root proximate an inner hub of the stator and a tip, the airfoil extending chord-wise between a leading edge and a trailing edge, a fillet disposed at the leading edge of the root of the airfoil and extending between a pressure side surface of the airfoil and the inner hub, the fillet having a radial height being maximum at the leading edge, the radial height decreasing from the leading edge to blend smoothly into a remainder of the airfoil, the fillet extending downstream from the leading edge a chord-wise distance of less than 50% of a chord length of the airfoil on the pressure side surface.

The gas turbine engine may include any of the following features, in whole or in part, in any combination.

In some embodiments, the chord-wise distance is from 10% to 50% of the chord length.

In some embodiments, a first staggered angle is defined at the fillet and a second staggered angle is defined at the leading edge of the airfoil at a point thereon radially above the fillet, the first staggered angle being from 5 to 10 degrees greater than the second staggered angle.

In some embodiments, the fillet being disposed only on the pressure side surface of the airfoil, a suction side surface being free of the fillet.

BRIEF DESCRIPTION OF THE DRAWINGS

Reference is now made to the accompanying figures in which:

FIG. 2 is a schematic side elevational view of a vane of a compressor stator of the gas turbine engine of FIG. 1;

FIG. 3 is a schematic cross-sectional view of the vane of the compressor stator of FIG. 2, taken through line 3-3 in FIG. 2;

FIG. 5A is a partial side perspective view of the vane of the compressor stator of FIG. 2; and FIG. 5B is a partial front perspective view of the vane of the compressor stator of FIG. 2.

DETAILED DESCRIPTION

Figure 1:
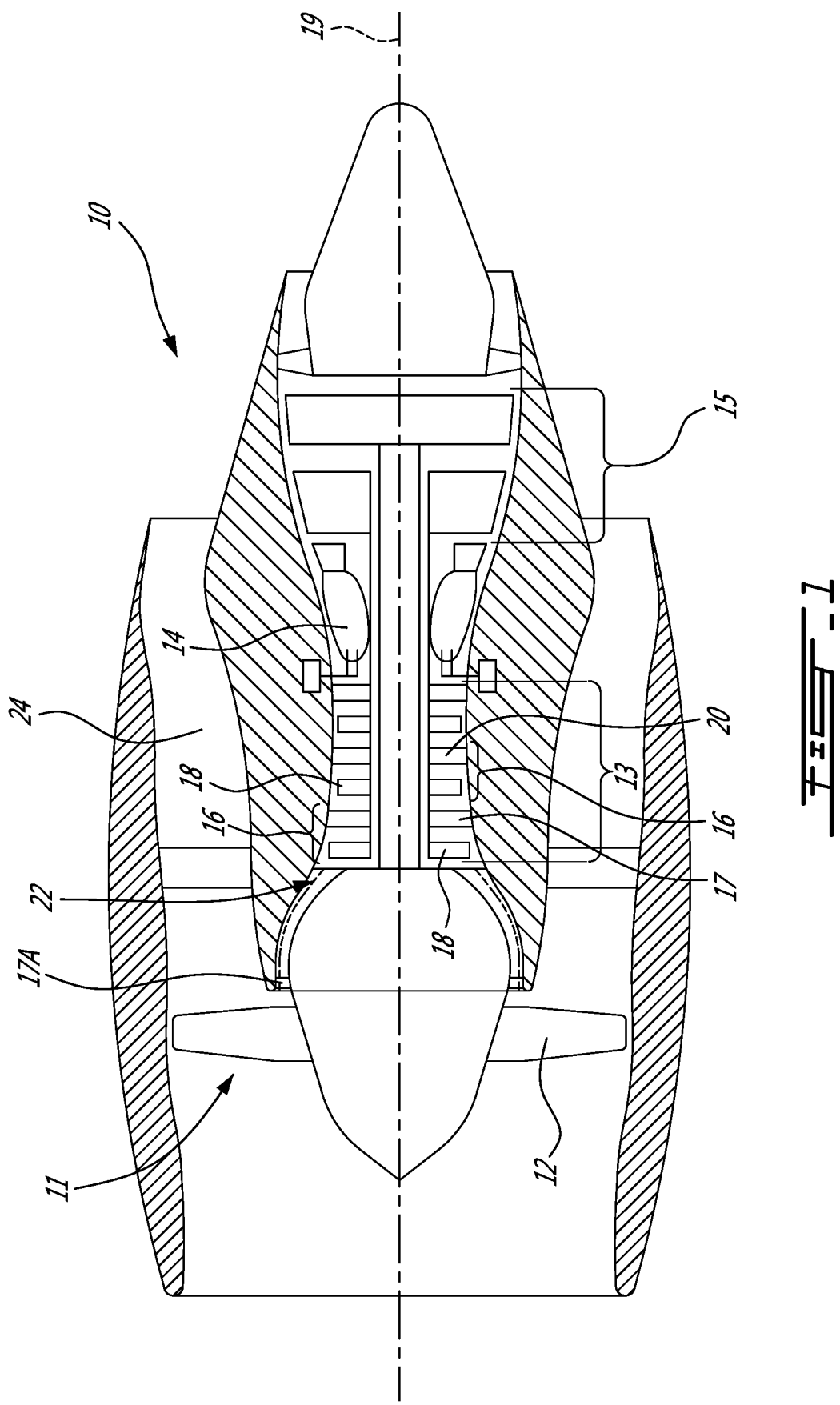
FIG. 1 is a schematic cross-sectional view of a gas turbine engine.

FIG. 1 illustrates a gas turbine engine 10 of a type preferably provided for use in subsonic flight, generally comprising in serial flow communication a compressor 13 for pressurizing the air, a combustor 14 in which the compressed air is mixed with fuel and ignited for generating an annular stream of hot combustion gases, and a turbine section 15 for extracting energy from the combustion gases.

The compressor 13 includes one or more axial compressor stages 16 within the core 22 of the gas turbine engine 10. Although the gas turbine engine 10 may be of different types (turboprop, turboshaft, turbofan, etc.), in the embodiment depicted in FIG. 1 the gas turbine engine 10 is a turbofan engine, and therefore includes a fan 12, upstream of the engine core 22, through which ambient air enters the engine. The air propelled downstream from the fan 12 is split into a bypass duct 24 and the engine core 22.

Each compressor stage 16 within the engine core 22 includes one or more rows of compressor stators 17 located immediately downstream of a row of compressor rotors 18. A fan core stator 17A, located downstream of the bladed rotor of the fan 12, is also disposed within the engine core 22, near an inlet thereof and upstream from the axial compressor stages 16. It is understood that the fan 12 forms part of the compressor 13 of the engine 10, and comprises a first stage, low pressure compressor. Accordingly, the fan core stator 17A and the compressor stators 17 of the downstream axial compressor stages 16 all constitute compressor stators, as defined herein, and may therefore have the compressor stator vanes 20 as will be defined hereinbelow.

Each of the compressor stators 17, 17A is a non-rotating component that guides the flow of pressurized air downstream from the compressor core rotors 18 and/or the fan 12. The compressor rotors 18 and the fan 12 rotate about a longitudinal center axis 19 of the gas turbine engine 10 to perform work on the air.

Each of the compressor stators 17, 17A comprises a plurality of stator vanes 20. Each stator vane 20 is a stationary body that diffuses the airflow impinging thereon, thereby converting at least some of the kinetic energy of the incoming airflow into increased static pressure. The stator vanes 20 also redirect the airflow toward the next downstream compressor rotor 18 and/or to the combustor (in the case of the most-downstream compression stage 16).

With reference now to FIGS. 2-5B, the stator vanes 20 of the compressor stators 17, 17A of the compressor 13 will now be described in further detail. It is understood that only one, or any two or more, of the stages of the compressor 13 may have the stator vanes 20 as described hereinbelow. For example, only the fan core stator 17A may be formed with the stator vanes 20 as described herein. Alternately, only one or more of the stator vanes 17 of the compressor 13 may have the stator vanes 20 as described herein. Alternately still, both the fan core stator 17A and the stator vanes 17 may all have the stator vanes 20 as described herein. The terms "upstream" and "downstream" as used herein are made with reference to the flow F of air through the compressor stators 17, 17A and thus the airfoil F over each vane 20 thereof.

Referring first to FIGS. 2-3, each stator vane 20 (or simply "vane" 20) of the present disclosure includes an airfoil 21 shaped and sized to effect the above-describe functionality. The airfoil 21 extends generally radially between a root 26, disposed adjacent to a radially inner hub 27 of the compressor stator 17, 17A, and a distal tip 28, disposed adjacent to an outer shroud 29 of the compressor stator 17, 17A. The airfoils 21 define a span S of the vane 20 which extends between the roots 26 and the tips 28. The airfoil 21 therefore extends substantially in a radial direction (i.e. in a direction that generally extends parallel to a radial line from the center axis 19 of the gas turbine engine 10), which extends between the root 26 and the tip 28, and which defines the radial span S of the airfoil 21. This may also be referred to as the height of the vanes 20.

The chord length C of the airfoil 21 is defined between a leading edge 30 of the airfoil 21, and a trailing edge 32 of the airfoil 21. The extent of the airfoil 21 along its chord is therefore defined between the leading edge 30 and the trailing edge 32, and is referred to herein as the chord length C. In the depicted embodiment, the chord length C is the length of the chord line, which may be thought of as a straight line connecting the leading and trailing edges 30 and 32.

The airfoil 21 also includes a pressure side surface 34 and a suction side surface 36, disposed on opposite sides of the airfoil and each extending between the leading edge 30 and trailing edge 32.

Referring still to FIGS. 2-3, the vane 20 further includes a fillet 40 disposed at the root 26 of the airfoil 21, proximate the leading edge 30. Each of the airfoils 21 accordingly has a root 26 with an asymmetrical fillet 40 on a leading edge pressure side of the airfoil. The fillet 40 is asymmetrical, and thus is such that it is larger on the pressure side of the airfoil than on the suction side of the airfoil. The term "larger" as used herein in this context is understood to mean a filet that is any one or more of taller, longer, wider, greater radius, thicker, greater volume, greater mass, or the like, and/or any combination of these characteristics. In the embodiment of FIGS. 2-3, for example, the fillet 40 on the pressure side 34 of the airfoil 21 protrudes outwardly from the pressure side surface of the airfoil a greater extent than does any filet (if one is present at all) located on the suction side 36 of the airfoil, and is therefore said to be larger than any filet on the suction side 36. (In this embodiment, however, the suction side 36 is substantially free of any filet.)

The fillet 40 may extend between the airfoil 21 and the radially inner vane platform 27, as seen in FIGS. 2 and 3. In the depicted embodiment, the fillet 40 is disposed exclusively on the pressure side 34 of the airfoil. While the fillet 40 may extend onto the suction side surface 36 of the airfoil 21 in certain alternate embodiments, in all cases the fillet 40 is larger on the pressure side surface 34 of the airfoil 21 than on the suction side surface 36, such a way that the fillet 40 is configured to provide a greater aerodynamic effect on the pressure side of the airfoil than on the suction side thereof. The term "larger" as used in this context is understood to mean any one of wider, higher, longer and/or thicker (or other corresponding sized-based physical properties). In the depicted embodiment, the fillet 40 is disposed only on the pressure side 34 only of the airfoil 21 (i.e. the fillet 40 does not extend around to the suction side surface 36 of the airfoil 21, such that the suction side 36 is free of any fillet 40).

The fillet 40 is disposed at the leading edge 30 of the airfoil 21, and extends at least partially along the leading edge a span-wise distance away from the root 26 of the airfoil 21. In one particular embodiment, the fillet 40 extends radially away from the root 26 a span-wise distance H of less than 10% of the total span S of the airfoil 21. More particularly still, the span-wise distance H of the fillet 40 may be from 2 to 10% of the total span S of the airfoil 21, beginning at the root 26 thereof.

Figure 4:
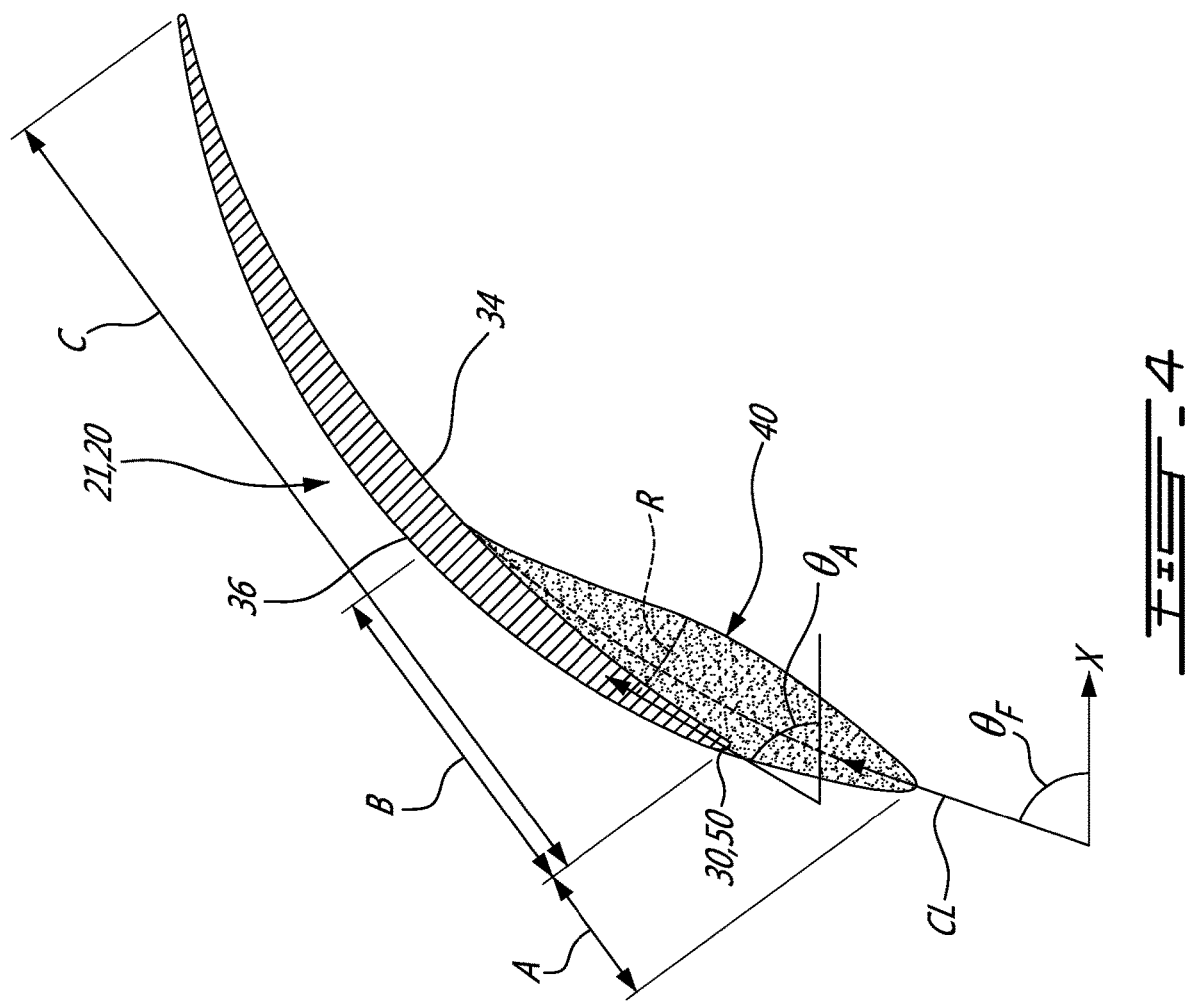
FIG. 4 is a schematic cross-sectional view of the vane of the compressor stator of FIG. 2, taken through line 4-4 in FIG. 2.

As best seen in FIGS. 2 and 4, the fillet 40 of the depicted embodiment axially extends upstream and/or downstream relative to the leading edge 30 of the airfoil 21. It is understood that the leading edge 30 as used in this context (i.e. as a stream-wise reference point for the fillet 40) corresponds to the leading edge 30 of a majority of the airfoil 21 of the vane 20 outside the region of the vane having the fillet 40. More specifically, if a radially extending axis 50 is axially (i.e. stream-wise) aligned with the leading edge 30 of a major portion of the airfoil outside the fillet region, this defines the location of the "leading edge 30" as used as a reference point for the axially extending extent of the fillet 40.

The fillet 40 may accordingly extend upstream and/or downstream relative to the leading edge 30 of the airfoil 21, on the pressure side 34 of the vane 20.

As seen in the embodiment of FIGS. 2 and 4, the fillet 40 axially extends upstream a distance A from the leading edge 30 (and the axis 50), and axially extends downstream a distance B from the leading edge 30 (and the axis 50).

In one embodiment, the fillet 40 is disposed only on an upstream half of the pressure side surface 34, and therefore the distance B may be less than 50% of the total chord length C. In a more particular embodiment, the distance B may be from 10% to 50% of the total chord length C.

In one embodiment, the fillet 40 is disposed only within a radially innermost portion of the airfoil 21, proximate the root 26, and therefore the distance H may be less than 10% of the total span S. In a more particular embodiment, the distance H may be from 2% to 10% of the total span S.

In one embodiment, the fillet 40 extends upstream of the leading edge 30 (and therefore the axis 50) a distance A that is less than 20% of the total chord length C. In a more particular embodiment, the distance A may be from 5% to 20% of the total chord length C.

Accordingly, the fillet 40 in effect extends the leading edge of the airfoil 21, at its root 26, upstream (e.g. by 5-20% of the airfoil chord at the hub) relative to a remainder of the airfoil outside the fillet region. This has the effect of increasing the staggered angle at the root 26 of the airfoil 21 of the vane 20. The staggered angle θ is the angle defined between a horizontal axis X and a camber line CL of the airfoil, at any given span-wise location on the leading edge 30.

As best seen in FIG. 4, the staggered angle $\theta_F$ at the fillet 40 is greater than a staggered angle $\theta_A$ of a majority of the airfoil 21 at the leading edge 30 outside of the fillet region. More specifically, the staggered angle $\theta_F$ of the fillet 40 may be between 5 and 10 degrees greater than the staggered angle $\theta_A$ of the airfoil 21 outside the fillet region. By increasing the staggered angle $\theta_F$ at the leading edge of the root 26 of the vane airfoil 21, due to the presence of the fillet 40, the incidence angle of the airflow F is reduced (relative to that over the remainder of the airfoil, outside the filleted region).

The fillet 40 may accordingly help improve aerodynamic performance and flow quality downstream of the stator 17,17A, and may increase the stall range of the compressor 13. A reduction in stator flow separation may also result, which can lead to performance improvements for the downstream rotor(s).

Referring still to FIG. 4, the fillet 40 may have a fillet radius R that is from 5% and 20% of the total span S of the airfoil 21.

As also best seen in FIG. 4, in order to create the fillet 40, the suction side surface 36 of the airfoil 21 is extended upstream (from the leading edge 30), to thereby form the higher staggered angle $\theta_F$. The suction side surface 36 is extended smoothly upstream along the suction surface by the distance A, which thereby increases the higher staggered angle $\theta_F$ relative to the staggered angle $\theta_A$ of the airfoil 21 outside the fillet region.

As can be seen in FIGS. 5A and 5B, the fillet 40 on the pressure side of the airfoil 21 may be shaped with a blended curve (i.e. a so-called "variable" curve fillet), so as to smoothly (in an aerodynamic sense) blend the leading edge extension formed by the fillet 40 smoothly back to/with the pressure side surface 34 and the leading edge 30 of the airfoil 21 and the inner hub of the stator. This variable fillet shape on the pressure side may help to speed up the pressure side airflow, and reduce secondary flow losses. For example, this may reduce transverse flow, which results in less surface boundary layer radial flow migration. This "variable" or blended fillet 40 accordingly helps to speed up the pressure side flow and reduce secondary flow. The vanes 20 having this fillet 40 may also cause less transverse flow, which can result in less surface boundary layer radial flow migration. Overall stage performance of the compressor 13 may as a result be improved (lower stator losses and better aerodynamic performance).

The above description is meant to be exemplary only, and one skilled in the art will recognize that changes may be made to the embodiments described without departing from the scope of the claims. Still other modifications which fall within the scope of the present claims will be apparent to those skilled in the art, in light of a review of this disclosure, and such modifications are intended to fall within the appended claims.

The invention claimed is:

1. A compressor for a gas turbine engine, the compressor comprising: a rotor rotatable about a central axis and a stator located downstream of the rotor, the stator comprising vanes, a vane of the vanes having an airfoil extending along a direction having a radial component relative to the central axis from a root proximate an inner hub of the stator to a radially outer tip, a span of the airfoil defined between the root and the radially outer tip, the airfoil having a leading edge defining an axially forward-most location of the airfoil relative to the central axis, a trailing edge, and a chord extending between the leading edge and the trailing edge to define a chord length, the airfoil having a pressure side surface and a suction side surface each extending on opposite sides of the airfoil between the leading edge and the trailing edge, and a fillet disposed at the leading edge of the root of the airfoil and extending between the pressure side surface of the airfoil and the inner hub, the fillet having a radial height being maximum at the leading edge, the radial height decreasing from the leading edge to blend smoothly into a remainder of the airfoil, the fillet extending downstream from the leading edge a chord-wise distance of less than 50% of a chord length of the airfoil on the pressure side surface, the fillet having a fillet suction side located on the suction side surface of the airfoil and extending in an upstream direction from a location on the suction side surface of the airfoil toward the leading edge, the fillet suction side extending tangentially from the location on the suction side surface, the location being downstream of the leading edge of the airfoil, the location being a downstream-most location of the fillet on the suction side surface of the airfoil, the location being closer to the leading edge than to a mid-chord location between the leading edge and the trailing edge.

2. The compressor of claim 1, wherein the chord-wise distance is from 10% to less than 50% of the chord length.

3. The compressor of claim 1, wherein the fillet extends upstream from the leading edge of the airfoil, the fillet extending away from the pressure side surface a greater distance than the fillet extends away from the suction side surface.

4. The compressor of claim 3, wherein the fillet extends upstream from the leading edge a second chord-wise distance of less than 20% of the chord length.

5. The compressor of claim 4, wherein the second chord-wise distance is from 5% to less than 20% of the chord length.

6. The compressor of claim 1, wherein the suction side surface being free of the fillet downstream of the location.

7. The compressor of claim 1, wherein the fillet extends radially away from the root a span-wise distance of less than 10% of the span of the airfoil.

8. The compressor of claim 7, wherein the span-wise distance is from 2% to less than 10% of the span of the airfoil.

9. The compressor of claim 1, wherein a first staggered angle is defined at the fillet, and a second staggered angle is defined at the leading edge of the airfoil at a point thereon outside of the fillet, the first staggered angle being greater than the second staggered angle, the first staggered angle is from 5 to 10 degrees greater than the second staggered angle.

10. The compressor of claim 1, wherein the fillet has a fillet radius that is from 5% to 15% of the span of the airfoil.

11. A turbofan engine comprising a fan and a casing defining a bypass duct surrounding an engine core defining an annular gas passage, a fan stator disposed within the engine core downstream of the fan, the fan stator including vanes circumferentially spaced-apart around a circumference of the fan stator within the annular gas passage, a vane of the vanes having an airfoil extending between a root and a tip spaced apart by a span of the airfoil, the airfoil having a leading edge defining an axially forward-most location of the airfoil relative to a central axis of the turbofan engine, and a trailing edge spaced apart along a chord by a chord length of the airfoil, a pressure side surface and a suction side surface respectively extending on opposite sides of the airfoil between the leading edge and the trailing edge, and a leading edge fillet disposed at the root of the airfoil on the pressure side surface, the leading edge fillet extending downstream from the leading edge a chord-wise distance of less than 50% of a chord length of the airfoil on the pressure side surface, the leading edge fillet having a fillet suction side located on the suction side surface of the airfoil and extending in an upstream direction from a location on the suction side surface of the airfoil toward the leading edge, the fillet suction side extending from the location on the suction side surface, the location being downstream of the leading edge of the airfoil, the location being a downstream-most location of the leading edge fillet on the suction side surface of the airfoil, the location being closer to the leading edge than to a mid-chord location between the leading edge and the trailing edge.

12. The turbofan engine of claim 11, wherein the chord-wise distance is from 10% to less than 50% of the chord length.

13. The turbofan engine of claim 11, wherein the leading edge fillet extends upstream from the leading edge a distance of from 5-20% of the chord length.

14. The turbofan engine of claim 11, wherein the leading edge fillet extends radially away from the root a distance of from 2-10% of the span.

15. The turbofan engine of claim 11, wherein a first staggered angle is defined at the leading edge fillet and a second staggered angle is defined at the leading edge of the airfoil at a point thereon radially above the leading edge fillet, the first staggered angle being from 5 to 10 degrees greater than the second staggered angle.

16. A gas turbine engine comprising: a compressor with a rotor and a stator located downstream of the rotor, the stator having vanes, a vane of the vanes having an airfoil extending span-wise between a root proximate an inner hub of the stator and a tip, the airfoil extending chord-wise between a leading edge defining an axially forward-most location of the airfoil relative to a central axis of the gas turbine engine and a trailing edge, a fillet disposed at the leading edge of the root of the airfoil and extending between a pressure side surface of the airfoil and the inner hub, the fillet having a radial height being maximum at the leading edge, the radial height decreasing from the leading edge to blend smoothly into a remainder of the airfoil, the fillet extending downstream from the leading edge a chord-wise distance of less than 50% of a chord length of the airfoil on the pressure side surface, the fillet having a fillet suction side located on a suction side surface of the airfoil and extending in an upstream direction from a location on the suction side surface of the airfoil toward the leading edge, the fillet suction side extending tangentially from the location on the suction side surface, the location being downstream of the leading edge of the airfoil, the location being a downstream-most location of the fillet suction side of the fillet, the location being closer to the leading edge than to a mid-chord location between the leading edge and the trailing edge.

17. The gas turbine engine of claim 16, wherein the chord-wise distance is from 10% to less than 50% of the chord length.

18. The gas turbine engine of claim 16, wherein a first staggered angle is defined at the fillet and a second staggered angle is defined at the leading edge of the airfoil at a point thereon radially above the fillet, the first staggered angle being from 5 to 10 degrees greater than the second staggered angle.

19. The gas turbine engine of claim 16, wherein the suction side surface is free of the fillet downstream of the location.

\* \* \* \* \*